INVENTOR
William M. Fish
BY *[signature]*
ATTORNEY 3,681,013
EXTRACTION OF ALUMINA FROM BAUXITE
William M. Fish, St. Louis, Mo., assignor to Aluminum
Company of America, Pittsburgh, Pa.
Filed Feb. 2, 1970, Ser. No. 7,831
Int. Cl. B01d 11/02; C01f 7/06
U.S. Cl. 23—143                                                         10 Claims

ABSTRACT OF THE DISCLOSURE

Preliminary low-pressure digestion extracts alumina from a coarse fraction of bauxite. Fines separated from the coarse fraction are also passed on for super-atmospheric digestion.

BACKGROUND OF THE INVENTION

This invention relates to extraction of alumina from bauxite. More particularly, it relates to an improved process whereby erosion normally encountered during high-pressure digestion of bauxite is substantially eliminated.

Certain bauxites, for example, bauxite from the Darling Range in Australia, contain considerable amounts of non-reactive iron and silica, the former being present, for example, as goethite or the like and the latter being often present in the form of quartz sand. As a result of the presence of this silica and sand, erosion, scaling and like problems are encountered in digesting the bauxite according to the well-known Bayer process and common modifications thereof whereby the bauxite is digested at high temperatures and pressures. The erosion problem is particularly serious in the flash-cooled section wherein after digestion at the high temperatures and pressures, the resulting slurry is flashed back to approximately atmospheric boiling point and pressure, for example, as described in detail in Turner and Weigel U.S. Pat. No. 2,107,919. The erosion is further accelerated due to the velocities encountered in the flash-cooling sections.

One way of solving this silica problem is to first treat a slurry of bauxite with caustic at a temperature which may be at or below the boiling point and at atmospheric pressure and then to separate the resulting sodium aluminate liquor from the resulting substantially insoluble residue prior to digesting the residue with additional caustic at high temperatures and pressures according to the standard Bayer or modified-Bayer process. This procedure is illustrated, for example, in Hungarian Pat. No. 153,583, British Pat. No. 13,875 (AD 1904) and French Pat. No. 360,086. The difficulty with such a procedure is that the harmful silica or quartz sand is still present in the residue being further treated with caustic.

Another way to reduce silica problems is to first digest the bauxite with a sufficient concentration of caustic and at sufficient temperature and pressure to either dissolve much of the silica or form a desilication product without dissolving any appreciable amount of alumina and then, without separating the resulting dispersed solids from the resulting liquor, continuing the digestion at the conventional high temperatures and pressures. The difficulty with this procedure is that coarse particles of undigested bauxite or of the silica in the form of a desilication product may still be present in the unseparated solids. Such a procedure is illustrated, for example, by U.S. Pat. Nos. 3,401,009 and 3,413,087 and British Pat. No. 726,717.

A third method of avoiding erosion problems in high-temperature, high-pressure digestion of bauxite is that practiced in Africa of employing only a low-pressure, low-temperature digest, for example, one performed at room temperature and at atmospheric pressure, wherein a high concentration of caustic is used. However, using such a system involves a considerable amount of dilution in the subsequent alumina hydrate precipitation stage, and this necessitates a complex evaporation unit if a concentrated caustic is to be reused.

Still another method which has been employed in an attempt to reduce silica problems has been grinding the bauxite to such a fine extent that there is no coarse fraction high in silica. This has tended to increase rather than decrease difficulties, however, as grinding energy requirements have been greater, clarification of fine mud has required additional equipment, washing has been harder, and there has been additional soda loss.

SUMMARY OF THE INVENTION

It is accordingly an object of this invention to provide a process for caustic digestion of bauxite which will substantially eliminate the silica problems heretofore encountered in the high-temperature, high-pressure digestion stage. Another object is to provide a process for caustic digestion of bauxite wherein the quartz sand or silica which has heretofore been present in the high-temperature, high-pressure digestion step of the process is largely removed prior to this step. Other objects will be apparent from the description and claims which follow.

In its broader aspects, my invention involves separating a coarse fraction from a fines fraction of bauxite prior to digesting the fines according to a conventional high-temperature and high-pressure system such as the modified Bayer process. This may be done by a dry or a wet process. That is, the fines may be separated from the coarse fraction while both are dry, or the coarse fraction may be separated from the fines while digesting the bauxite with spent liquor, generally supplemented by additional caustic, at substantially atmospheric pressure to extract alumina from the coarse fraction. Spent liquor is the liquor remaining after precipitation of alumina following the high-temperature, high-pressure digestion. Thus, the liquor entering the conventional high-temperature and high-pressure digestion stage is rich in alumina removed from the separated coarse fraction. The fines may be introduced to the high-temperature, high-pressure digestion stage either separately or suspended in the liquor which contains alumina extracted from the coarse fraction. It is preferred that when the separation of coarse from fines is accomplished as a part of the preliminary low-pressure digestion stage the spent liquor not be permitted to contact the fines.

According to my invention separation may be accomplished while alumina is being extracted from the coarse fraction by introducing the spent liquor at the opposite end from which the bauxite (or the coarse fraction when a dry process is used to separate coarse from fines) is introduced to one or more vessels in which the preliminary digestion takes place at substantially atmospheric pressure. It is preferred to operate at a temperature no higher than atmospheric boiling point. Thus, the temperature in this preliminary digestion stage may range from about 170 to about 230° F. The spent liquor moves countercurrently to the direction of movement of the coarse bauxite so that the liquor which leaves the one or more vessels at a point usually relatively close to the point at which the bauxite enters is substantially saturated with respect to alumina at the caustic concentration and temperature maintained, and, when separation is also being accomplished while alumina is being extracted from the coarse fraction, carries along with it substantially all of the fines fraction. One way in which both separation and extraction may be brought about in a web process according to our invention is to provide within the one or more vessels a fractionating device which permits removal of coarse particles from the bottom of the one or more vessels and removal of the fines with the liquor leaving near the top of the one or more vessels to be conducted to the high-temperature, high-pressure digestion stage. In this instance the coarse particles leaving the system near the point where the spent liquor enters are generally substantially free from available alumina. When fines are separated from coarse particles in such a wet process, the classification may be accomplished simply by permitting settling of the coarse particles, for example, about +80 mesh, with the fines, for example, about −80 mesh, being carried countercurrently to the direction of movement of the heavier coarse particles, for example, upwardly, or by any conventional separation device. In such an operation the fines are carried from the separation vessel or vessels with liquor substantially saturated with alumina extracted from the coarse particles. In this manner not only may alumina be extracted from the coarse fraction but also the coarse fraction may be separated from the fines. More or less of a fluidized bed is preferably created by the countercurrent flow of the stream of spent liquor which is digesting the alumina from the coarse fraction. In this embodiment, as it moves countercurrently to the direction of flow of the fines, the spent liquor picks up alumina by digestion from the coarse particles to the extent that by the time it reaches the point of exit from the one or more digestion vessels near the point where the bauxite enters, it is substantially saturated with alumina from the coarse particles or fraction. Thus, according to my invention not only may the coarse fraction which contains the deleterious quartz and inert iron ($Fe_2O_3$ sand) be separated from the fines fraction prior to the conventional high-temperature, high-pressure digestion stage, but also substantially all of the alumina which it is possible to extract from the coarse fraction may be removed during a preliminary low-pressure digestion stage.

While the pressure used in my preliminary digestion stage is generally substantially atmospheric, low pressures of up to about 30 p.s.i. may be used according to my invention.

According to one embodiment of the invention plurality of preliminary digestion vessels may be used such that what extraction is not accomplished in one may be more efficiently accomplished in one or more others by using several vessels in series. When wet separation is employed, the coarse fraction may be separated from the fines by any conventional method, for example, by screening, flotation, settling, elutriation, centrifuging or the like. The bauxite may be treated or classified in fluidized beds supported on perforated plate decks in one or more vessels.

DESCRIPTION OF THE DRAWING

For a better understanding of my invention, reference will now be made to the drawing, in which

In FIG. 1, which illustrates in brief and simplified form the step of preliminary removal of coarse particles of bauxite according to my invention prior to a conventional high-temperature, high-pressure digestion stage, bauxite is introduced via line 2 into atmospheric or slightly higher pressure vessel 3 moving in the direction indicated by the arrow. (In the drawing, direction of stream or current flow is indicated by arrows.) Spent liquor containing makeup caustic enters vessel 3 via line 4 and moves countercurrently to the direction of flow of the settling particles of the coarse fraction of the bauxite which is introduced via line 2 and from which coarse fraction alumina is removed by digestion during such countercurrent flow pattern. Coarse particles may be removed via line 8. Liquor containing fines and alumina digested from the coarse particles of bauxite is conducted via line 5 (through steam heaters, if desired) to super-atmospheric, high-temperature pressure digester 6, to which additional caustic solution may be added as required to extract alumina from the fines to join the alumina already extracted from the coarse fraction in low-temperature, low-pressure vessel 3. In the alternative, both vessel 3 and vessel 6 may be a plurality of vessels.

In FIG. 2, which includes an alternate embodiment of my invention and is in more detail, bauxite is introduced to rod mills 10 via line 12. The ground bauxite travels via line 14 to a slurry mixer 16, wherein a slurry is formed by introduction thereto of spent liquor containing makeup caustic via line 18. A portion of the spent liquor may also be introduced into the rod mills 10 via line 20. The slurry formed in the slurry mixer 16 is conducted via line 22 to a first digester 24 of a series of three digesters, which may be operated at substantially atmospheric pressure. In digester 24 a coarse fraction, which as a result of fluidized beds supported on perforated plate decks (not shown), or like separating device included therein, collects in the lower part, is pumped by slurry pump 26 in line 27 to a second digester 28, from which in a like manner a coarse fraction from the lower part thereof is pumped by pump 30 in line 32 to third digester 34. Spent liquor is conducted countercurrently into the third digester 34 by line 36 and then, carrying the overflow fines fraction from digester 34 with it, via steam heater 38 in line 40 to the second digester 28. In a similar manner, the overflow containing the fines fraction in the second digester 28 is conducted via steam heater 42 in line 43 to the first digester 24. The final fines fraction is conducted via line 44 to a settler 46, from which the overflow containing fines and alumina extracted from the coarse fraction of the bauxite by the countercurrent flow of spent liquor through digesters 24, 28 and 34, is conducted via line 48 through steam heaters 50, 52 and 54 to digesters 56, 58 and 60, wherein digestion at high temperature and high pressure extracts alumina from the fines. The resulting liquor is conducted via line 62 to flash tanks 64, 66 and 68, wherein the liquor is flashed back to substantially atmospheric pressure and temperature. Steam from flash tanks 66 and 68 may be conducted via lines 74 and 76 to heaters 70 and 72, where it may be combined with spent liquor recycled via line 78. Caustic may be introduced via line 79. Steam from flash tank 64 may be conducted via line 80 to heater 50. Spent liquor then proceeds via lines 82, 18 and 20 to slurry mixer 16 and rod mills 10. The underflow from the first flash tank 64 is conducted via line 84 to the second flash tank 66. The underflow from the second flash tank 66 is conducted via line 86 to the third flash tank 68. The underflow from the third flash tank 68 is conducted to a settler 88, from which the sodium aluminate liquor overflow is conducted to filters 90 via line 92. The green sodium aluminate liquor leaving the filters 90 via line 94 is used for precipitation of alumina hydrate therefrom, for example, by carbonation or seeding. The solids from settler 88 are conducted via line 96 to washer 98, from which the washed mud is removed at line 100, water being introduced into the washer 98 via line 102. The coarse fraction from the third digester 34 of the predigestion stage is pumped by pump 104 in line 106 to a hopper de-waterer 108, in which it may be washed with water entering at line 110 and from which it may be removed at line 112 as washed sand. Steam enters heater 54 at line 114.

DESCRIPTION OF PREFERRED EMBODIMENT

Figure 2:
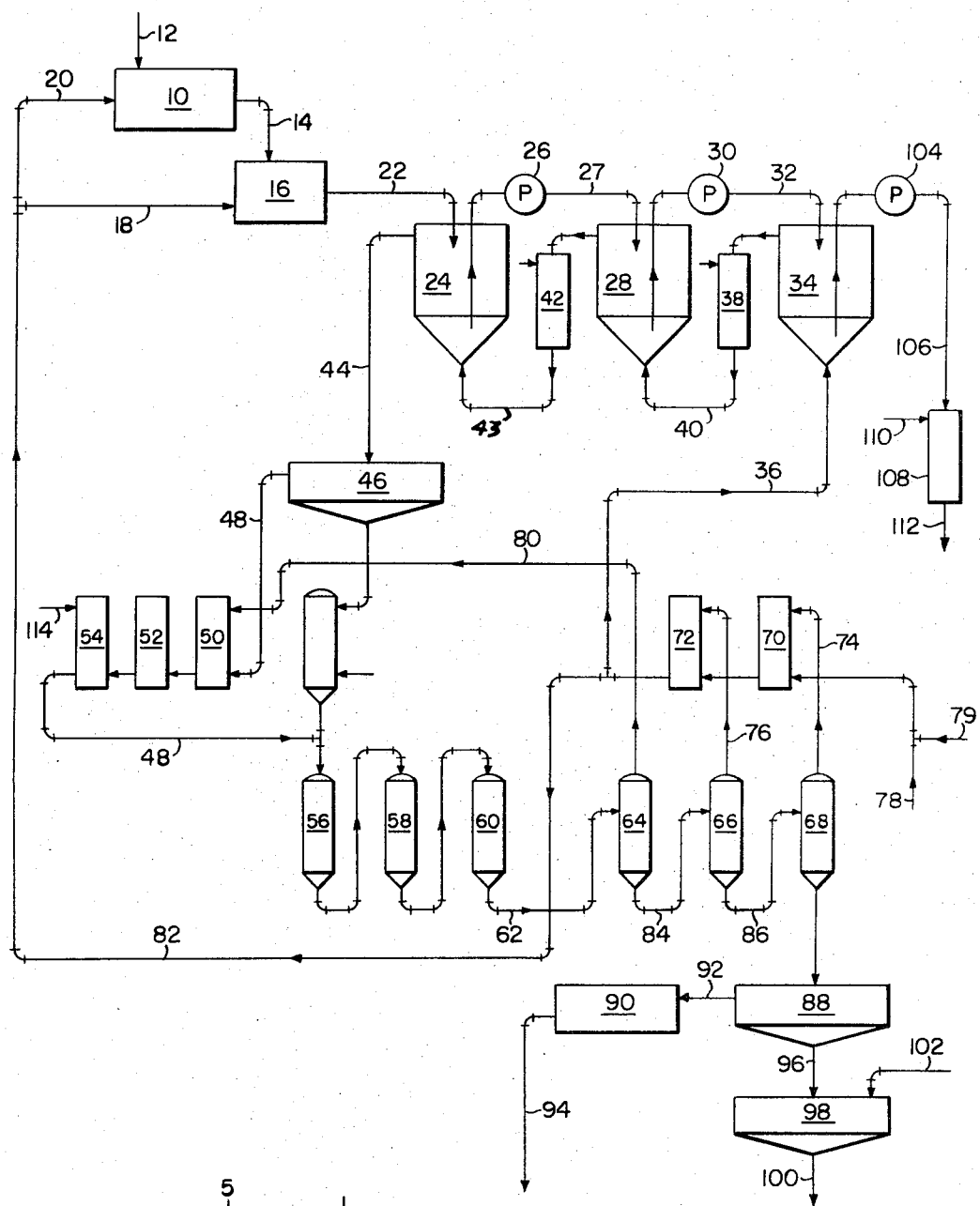
FIGS. 1 and 2 are schematic representations of the process of my invention in flow sheet form.
Figure 1:
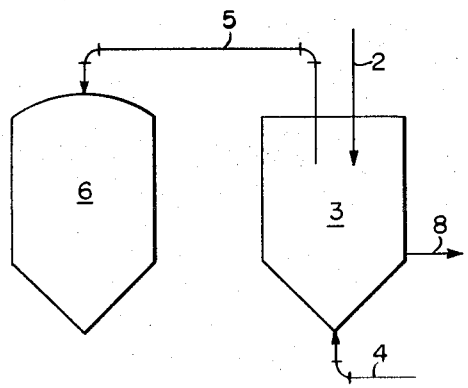

The following example is illustrative of my invention. A 68 g./l. slurry of bauxite containing approximately 40% $Al_2O_3$ and 28% (approximately 0.8% reactive) $SiO_2$ was preliminarily digested in a plurality of vessels as in FIG. 2 by caustic supplied countercurrently as caustic spent liquor having an alumina to total caustic (caustic expressed as g./l. $Na_2CO_3$) ($Al_2O_3$/TC) ratio of about 0.33 from a conventional Bayer-precipitation step at substantially atmospheric pressure and a temperature of about 200° F. At this point extraction from the coarse fraction was substantially complete as confirmed by an analysis of the coarse mud. An overflow stream containing a fines fraction (−40 mesh) and alumina removed from the coarse fraction had a silica to total caustic ratio ($SiO_2$/TC) of 0.0047 and an $Al_2O_3$/TC ratio of about 0.48. Digestion was continued in a plurality of digesters in a conventional high-temperature, high-pressure stage at a temperature of 290° F. and a pressure of 43 p.s.i.g. until the $Al_2O_3$/TC ratio was about 0.63. The resulting sodium aluminate liquor was then flashed back to substantially atmospheric pressure and temperature prior to having the alumina separated therefrom by precipitation by seeding.

According to the procedure of the invention erosion may be reduced to less than 10% of that obtained by prior art processes wherein no preliminary separation of coarse fraction from fines is made.

While the invention has been described in terms of preferred embodiments, the claims appended hereto are intended to encompass all embodiments which fall within the spirit of the invention.

Having thus described my invention and certain embodiments thereof, I claim:

1. In a process for recovery of alumina from bauxite by high-temperature and high-pressure caustic digestion, the improvement which comprises including in bauxite liquor undergoing digestion in the high-temperature, high-pressure digestion stage
   (1) a fines fraction which has been separated from a coarse fraction of bauxite and
   (2) alumina which has been extracted from a coarse fraction of bauxite,
thereby substantially inhibiting erosion in said high-temperature, high-pressure digestion stage.

2. The improvement of claim 1 wherein the separation of the coarse fraction from the fines fraction and the extraction of the alumina from the coarse fraction are accomplished by means of a fluidized bed.

3. The improvement of claim 1 wherein the separation of the coarse fraction from the fines fraction is made while the bauxite is in dry form.

4. The improvement of claim 1 wherein the separation of the coarse fraction from the fines fraction and the extraction of the alumina from the coarse fraction are accomplished in a plurality of vessels arranged in series.

5. The improvement of claim 1 wherein the separation of the coarse fraction from the fines fraction and the extraction of alumina from the coarse fraction are conducted at substantially atmospheric pressure and substantially atmospheric boiling point.

6. The improvement of claim 1 wherein the fines fraction and the alumina are introduced to the high-temperature, high-pressure digestion stage in a stream of liquor which contains substantially all of the alumina extractable from the coarse fraction and said stream is substantially saturated with respect to alumina.

7. The improvement of claim 1 wherein the separation of the coarse fraction from the fines fraction is accomplished by means of fluidized beds supported on a false bottom with passages through which fluidizing solution can pass.

8. The improvement of claim 1 wherein the coarse fraction is separated from the fines fraction by flowing caustic countercurrently to the direction of flow of the bauxite at a pressure not exceeding about 30 p.s.i., said flowing caustic extracting alumina from the coarse fraction.

9. The improvement of claim 8 wherein the caustic comprises spent liquor remaining after precipitation of alumina from the liquor resulting from the high-temperature, high-pressure digestion.

10. The improvement of claim 8 operated substantially continuously.

References Cited

UNITED STATES PATENTS

| | | | |
|---|---|---|---|
| 2,244,194 | 6/1941 | Haglund | 23—143 |
| 1,648,262 | 11/1927 | Frost | 23—143 |
| 2,107,919 | 2/1938 | Turner et al. | 23—143 |
| 2,143,310 | 1/1939 | Fulda et al. | 23—143 |

EARL C. THOMAS, Primary Examiner

H. S. MILLER, Assistant Examiner

U.S. Cl. X.R.

23—270 R